June 14, 1938. J. L. SPENCE, JR., ET AL 2,120,654
MOVING PICTURE CAMERA LENS SUBSTITUTION DEVICE
Filed Aug. 22, 1933

INVENTORS:
John L. Spence Jr.;
Jacob F. Leventhal;

BY Harold D. Penner, ATTORNEY.

Patented June 14, 1938

2,120,654

UNITED STATES PATENT OFFICE

2,120,654

MOVING PICTURE CAMERA LENS SUBSTITUTION DEVICE

John L. Spence, Jr., Brooklyn, and Jacob F. Leventhal, New York, N. Y., assignors to Akeley Camera, Inc., New York, N. Y., a corporation of New York Application August 22, 1933, Serial No. 686,226

12 Claims. (Cl. 88—16)

This invention relates to cinematography and more especially to lens-substitution during camera operation.

In cinematography it is common practice to change from one magnification to a different one of the object or scene photographed and these magnification changes result in two general classes—"long shot" and "close up". When two separate cameras may be used the problem is simple because one camera may be set for one magnification and the other for the other. But when a single camera is used, the magnification change must be made in one of two ways: (1) By a change of distance between lens and object without change of lens, (2) By a change of lens without change of distance.

When the cinematography is not accompanied by synchronously recorded sound, either of the two methods may be used. When, as is largely the case today, synchronous sound-recording is necessary the first method is entirely impracticable for most purposes for the reason that it is well-nigh impossible to break the sound sequence except at some natural pause, after which the camera position is changed and synchronous sound-recording resumed. This method is entirely impracticable where, for example, a public speaker is being recorded since the operator cannot exercise control over the speaker.

The second method lends itself more readily to synchronous recording. A crude arrangement is at present in use whereby a quick mechanical shift may be made which will replace one lens by another while sound recording and film-progression continue uninterruptedly. The disadvantage is that during the time of shift, since the film is in motion, a useless picture record section is produced for a duration of several picture-frames and these must be usually eliminated and, in the case of synchronous sound recording, the sound and picture sequence is thus destroyed.

It would be highly desirable to "fade out" the scene being recorded by the first lens and simultaneously "fade in" the scene to be recorded by the second lens. An object of this invention is to make possible such a double fade during the period of transition thus eliminating the useless picture record section, and keeping the sequence of synchronous sound and picture recording unbroken.

Thus the objects of the present improved method are to utilize a pair of lenses, one of long focus and the other of short focus, served by a reflecting system which is used for only the short focus lens, second, to provide a double fade or dissolve out means which of itself is actively operative in serving both lenses for simultaneous reverse fading action, third to utilize the fade out means as light shield for the direct long focus optical system, when the indirect short focus optical system is operative, and fourth to utilize the foregoing outlined means in conjunction with a sound and picture recording mechanism.

In U. S. Patent Serial No. 1,770,351 is shown a method whereby the lens substitution and double-fading may be accomplished. A decided disadvantage is that a radical change in camera construction is required since the picture recording must be done at two separate picture apertures. Another object of the present invention is to accomplish the desired result by use of only one picture aperture thus avoiding change in camera construction.

These objects are obtained by the arrangement illustrated in the accompanying drawing in which.

Figures 2, 3A, 3B, 3C:
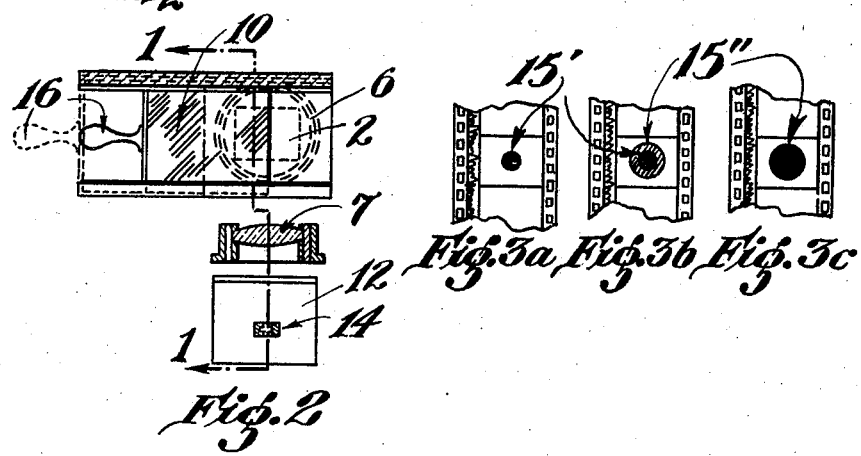
Fig. 2 is a cross-sectional view of Fig. 1 taken approximately on line 2—2.

Figs. 3a, 3b, and 3c show three views of finished film before, during and after transition.

Figure 4:

Fig. 4 is an elevation view of an improved part of the arrangement.

Similar numbers refer to similar parts throughout the several views.

Figure 1:
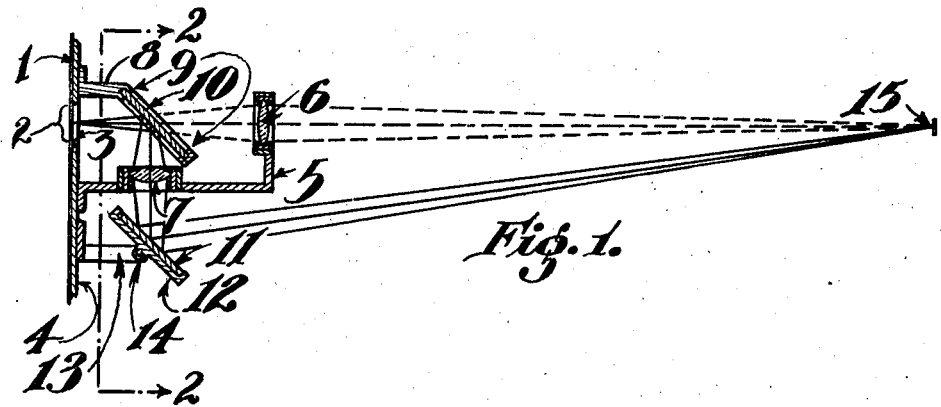
Fig. 1 is a partly schematic longitudinal section taken along 1—1 of Fig. 2.

Referring now to Fig. 1, which is a cross section taken at 1—1 of Fig. 2, a film 1 has an area of exposure 2 at aperture 3 in camera front plate 4. Suitably mounted in a support 5 attached to plate 4 are a long focus lens 6 and a short focus lens 7. A support 8 having guideways 9 slidably supports a slidable reflector 10, which is movable in a plane perpendicular to the paper. A reflector 11 mounted in a frame 12 is carried by support 13 fastened to plate 4. A hinge 14 makes possible various settings of reflector 11. Light from an object 15 to be photographed is received by lens 6 as indicated by broken lines and also by lens 7 as indicated by solid lines, after reflection by reflector 11. When the reflector 10 is positioned so as to fully intercept light traveling from both lenses to film aperture 3, the lens 7 will be effective since the light will be reflected to the aperture by reflector 10 while the lens 6 will be ineffective since the reflector 10 also acts as a shield and prevents light reaching the film aperture 3. When, however, the reflector 10 is in a transitional position, part of the light will reach the aperture from both lenses.

A transitional position of reflector 10 is shown at Fig. 2 which is a cross section along line 2—2 of Fig. 1. At this position, the reflector half-way covers lens 6 and only half the light from 6 will be transmitted to area 2. Similarly half the light from lens 7 will reach the area 2 because only half of it may be reflected by the mirror in the position shown. The reflector is manually operated by means of the handle 16. When the reflector shield 10 is completely out of both light paths it occupies the position shown by dotted lines.

Figs. 3a, 3b and 3c respectively show three portions of the finished film. The view of Fig. 3a shows the photographic image 15' of the object 15 as recorded by lens 7, the reflector 10 at that time fully intercepting the light-paths of both lenses. The view of Fig. 3b shows the photographic composite image 15'—15'' of object 15 photographed partially by both lenses 6 and 7 and the view of Fig. 3c shows the image 15'' of the object 15 as recorded by lens 6 only, with the reflector at that time completely out of the light-paths of both lenses.

The reflectors shown may obviously be reflecting prisms, back or front silvered surfaces or polished mirrors. An improved form of reflector that might be used in place of reflector 10 is shown at Fig. 4. Here a plate of glass 17 has a section 18 completely silvered and corresponding to the period of complete reflection and occultation and a remaining section partially silvered and partially transparent. The silvered portions 19 alternate with the transparent portions 20. As the mirror is drawn across the two light paths, a more uniform dissolve will take place due to the fact that light from both lenses is better distributed.

Obviously, instead of a number of silvered prongs, as shown in Fig. 4, one prong centered on the lens axis may be used. Also, the spaces 20 might be open spaces instead of transparent spaces. Thus it will be seen that the present method permits of simultaneous fast or slow dissolve, or fade in and out between long and short shots, or vice versa, of an object, upon a sound and picture record, whereby a useless picture record section is obviated, and therefore, without loss of picture and sound synchronism upon the film. It is further obvious that the structure herein outlined, because of the direction of the object beams to a common, single film aperture and area is readily adaptable to any standard picture film recording machine.

While the arrangement shown is designed for different magnifications of the same scene, it is evident that totally different scenes may be photographed through angularly changing the position of reflector 11.

We claim:

1. A dissolve fading mechanism for moving picture cameras having a single exposure aperture, comprising, in combination, a direct axis long focus optical system, an indirect axis short focus optical system, said second optical system having its focal axis intersecting the axis of said first optical system and forming a joint focal system to direct light to said aperture, a slidable light shield for intercepting the light from the long shot focal system, said shield being mounted at an angle at the intersection of said focal axes, a mirror carried by said shield for reflecting the light from said short focus optical system into the axis of the long focal system, means for slidably supporting said shield and mirror for movement into or out of the intersection axes of said optical systems; a second mirror located at an angle to the axis of said short focus optical system, and means for slidably moving said first mirror and shield in and out of said intersection, both optical systems being focused upon a single object.

2. In a motion picture apparatus, in combination with a camera wall having therein an exposure aperture, a support carried by the wall and having thereon and parallel to, and in front of said aperture a long focus lens, said lens being on the axial line of the aperture, said line being extensible to an object to be photographed, a short focus lens also carried by said support and disposed at right angles to the axial line of said aperture, the axial line of said short focus lens intersecting the axial line of said long focus lens and aperture, a reflector pivotally carried by said wall and adapted to cast the image of the object through the short focus lens to said aperture by intersecting the axial line of said long focus lens, an opaque member mounted for movement into and out of the intersection of the axes of said long and short focus lenses, and a reflector carried by said opaque member, said reflector being adapted to cast the image from the short focus lens into said aperture, and shut off the image of the long focus lens.

3. In combination, a camera including a pair of lenses of different focus; a reflecting means; means mounting said reflecting means and lenses in position to conduct separately through said lenses beams from the same object coaxially to the focal plane of the camera the beams being at a point of intersection before reaching the focal plane of the camera; said reflecting means including fading means for gradually decreasing the effective rays from one lens while increasing the effective rays from the other, while maintaining the focuses of said lenses constant, said reflecting means including a member having a reflecting surface slidable in its own plane at said intersection and positioned to reflect one of the beams and transmit the other beam; said reflecting surface being continuous at one end of the member and having long tapered portions extending from the continuous portion longitudinal to the path of movement.

4. In a camera, means forming intersecting beams; slidable means for reflecting one beam coaxially of the other into the camera, part of the reflecting means being transparent to transmit said other beam; said reflecting means including a member having a reflecting surface slidable in its own plane at the intersection and positioned and slidable to reflect all of the reflected beam or transmit all of the other beam; said reflecting surface being continuous at one end of the member and having long tapered portions extending from the continuous portion and longitudinal to the path of movement of the member; the member being transparent at the other end and having transparent portions between said tapering portions.

5. A reflecting member having a reflecting surface, said reflecting surface being continuous at one end of the member and having long tapered portions extending in a single direction from the continuous portion; the member being transparent at the other end and having transparent portions between said tapering portions.

6. In combination, a camera having a front lens coaxial with the main axis of the camera; a side lens; a reflecting means; means mounting said reflecting means and side lens on said camera in position to cause light from a remote point of said main axis to intersect the main axis at a point near the camera; a slidable opaque reflector member having a rearwardly reflecting surface transverse to said axes at the intersection thereof and reflecting axial rays from the side lens along the main axis into the camera; and guide means for slidably mounting said reflector member so that said surface moves, along its own plane only, into and out of the rays from said lenses.

7. In combination, a camera having a front lens coaxial with the main axis of the camera; a side lens mounted on said camera near said main axis and having its axis intersecting the main axis at a point between the focal plane and the front lens; means mounted to reflect light from a remote point in said main axis through the side lens along the axis thereof to the main axis; a slidable opaque reflector member having a rearwardly reflecting surface transverse to said axes at the intersection thereof and reflecting axial rays from the side lens along the main axis into the camera; and guide means for slidably mounting said reflector so that said surface moves, along its own plane only, into and out of the rays from said lenses.

8. A combination as in claim 7, in which said reflecting member is transparent at one part and reflecting at other parts, said parts being movable into and out of the space adjacent to said axes.

9. In combination, a camera having a long-focus lens coaxial with the main axis of the camera; a short focus lens mounted on said camera near said main axis and having its axis intersecting the main axis at a point between the focal plane and the long focus lens; means mounted to reflect light from a remote point in said main axis through the short focus lens along the axis thereof to the main axis; a slidable reflector having a rearwardly reflecting surface transverse to said axes at the intersection thereof and reflecting axial rays from the short focus lens along the main axis into the camera; and guide means for slidably mounting said reflector so that said surface moves along its own plane only.

10. In combination, a camera having a front exposure aperture; a front lens mounted frontward of said opening coaxial with the main axis of the camera and opening and between said opening and an object to be photographed in said axis remote from the camera; a side lens mounted on said camera near said main axis and having its axis intersecting the main axis at a right angle thereto at a point between said aperture and the front lens; a slidable reflector having a rearwardly reflecting surface and mounted with said surface at the intersection of said axes at 45 degrees thereto, guide means for slidably mounting said reflector with said surface, in its own plane only, in a direction perpendicular to the plane of the two axes; and a mirror adjustably mounted to reflect light from said object through the side lens along the axis thereof, to the slidable mirror, and thence along the main axis into the camera.

11. In combination, a camera having a front lens coaxial with the main axis of the camera; a side lens of different focus mounted on said camera near said main axis and having its axis intersecting the main axis at a point between the focal plane and the front lens; means mounted to reflect light from a remote point in said main axis through the side lens along the axis thereof to the main axis; a slidable reflector member having an opaque rearwardly reflecting surface transverse to said axes at the intersection thereof and reflecting axial rays from the side lens along the main axis into the camera; and guide means for slidably mounting said reflector so that said surface moves, along its own plane only; said reflecting surface when in one position of the reflector member reflecting substantially all of the rays from the side lens into the camera, another part of the reflector member being adapted when the member is in another position to allow substantially all of the rays to enter into the camera; the portion of said member between said surface and part being adapted, to transmit some of the light from the front lens and to reflect some from the side lens into the camera.

12. In a combination as in claim 11, said portion of said member between said surface and part gradually increasing from said surface toward said part, in light-transmitting power and gradually decreasing in reflecting power.

JOHN L. SPENCE, Jr.
JACOB F. LEVENTHAL.